United States Patent Office 3,398,166
Patented Aug. 20, 1968

3,398,166
DISMUTATION OF ALDEHYDES
Roy B. Duke, Jr., Smyrna, Ga., and Milton A. Perry, Longview, Tex., assignors to Eastman Kodak Company, Rochester, N.Y., a corporation of New Jersey
No Drawing. Filed Aug. 27, 1964, Ser. No. 392,634
7 Claims. (Cl. 260—413)

ABSTRACT OF THE DISCLOSURE

Aldehydes having a single hydrogen atom attached to the alpha-carbon atom and having the general formula $R^1R^2$ CHCHO, wherein $R^1$ and $R^2$ are alkyl of 2 to 8 carbon atoms, condense to the corresponding alcohol and monocarboxylic acid salt when contacted with an alkali metal hydroxide or alkali metal alkoxide at Cannizzaro reaction conditions. A valuable use of the disclosed process is in the manufacture of acid salts usable as driers for paints.

DISCLOSURE

This invention relates to a process for converting an aldehyde containing hydrogen on the alpha-carbon atom to the corresponding alcohol and acid salt.

The Cannizzaro reaction, which is reported to be characteristic of aldehydes having no hydrogen on the alpha-carbon atom e.g., benzaldehyde, involves the dismutation of the aldehyde to the corresponding alcohol and acid. The presence of one or more hydrogen atoms on the alpha-carbon atom makes the aldehyde susceptible to aldol condensation in preference to the Cannizzaro reaction. In the review of the Cannizzaro reaction by T. A. Geissman, Organic Reactions, vol. II, John Wiley & Sons, 1944, only one instance is reported of the dismutation of an aldehyde having an alpha-hydrogen atom to the corresponding acid and alcohol. The aldehyde was isobutyraldehyde but the reaction conditions were markedly different from those in the Cannizzaro reaction of aldehydes having no alpha-hydrogen atoms. Geissman gives no examples of the dismutation of an aldehyde with a single alpha-hydrogen atom to the corresponding acid and alcohol using the reagents and conditions commonly employed in the Cannizzaro reaction, e.g., temperatures below about 150° C. and the use of 30–50% sodium hydroxide or potassium hydroxide. Under the latter conditions isobutyraldehyde gives isobutyraldol and related products.

The present invention is based on our discovery that certain aldehydes having a hydrogen atom attached to the alpha-carbon atom, atoms are dismutated to the corresponding alcohol and monocarboxylic acid when contacted with an alkali metal hydroxide or alkoxide at a temperature of 40 to 250° C. The method of the invention can be represented by the following equations:

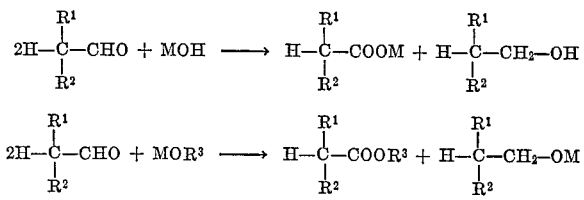

$R^1$ and $R^2$ are straight or branched chain alkyl of 2 to 8 carbon atoms, $R^3$ is straight or branched alkyl of up to about 8 carbon atoms and M is an alkali metal. Preferably R' is ethyl, $R^2$ is alkyl of 2 to 4 carbon atoms, $R^3$ is lower alkyl and M is sodium.

In our process, contrary to previous reports in the literature, aldehydes of the formula $R^1R^2$CHCHO, wherein $R^1$ and $R^2$ are alkyl groups of at least 2 carbon atoms, dis- mutate to the acid and alcohol. The best results are obtained when $R^1$ is an ethyl group and $R^2$ is a straight or branched alkyl of 2 to 4 carbon atoms. Examples of suitable aldehydes include 2-ethylbutanal, 2-ethylpentanal, 2-ethylhexanal, 2-ethyloctanal, 2-ethyldecanal, 4-methyl-2-ethylheptenal, and 2-ethylisohexanal.

The method of the invention is illustrated by the following examples.

Example 1

2-ethylhexanal, 512 g. (4 moles), and 50% sodium hydroxide, 320 g. (4 moles) were weighed into a 3-liter, 3-necked flask equipped with a stirrer, thermometer and reflux condenser and subsequently heated to reflux (125–130°). Refluxing was continued for five hours. The mixture was allowed to come to room temperature and then transferred to a separatory funnel. Two distinct phases separated. The lower layer (215 g.) was separated and analyzed and was found to contain 36.9% sodium hydroxide and a trace (<1%) of sodium 2-ethylhexanoate. The upper layer, containing alcohol and acid salt, was diluted with 2–3 volumes of water. The diluted alcohol-acid salt solution was placed on a continuous organic decanter and refluxed for 20 hours recovering 255 g. of organic material which analyzed 95%+ 2-ethylhexanol. Only a trace of unreacted aldehyde could be found. The aqueous salt solution (811 g.) was titrated potentiometrically with standard hydrochloric acid and found to contain 3.7% sodium hydroxide and 40.6% salts as sodium 2-ethylhexanoate. The yields were 97% to ethylhexanol and 98% to sodium 2-ethylhexanoate. The aqueous salt solution was cloudy but a simple filtration gave a clear solution. This solution was light yellow in color.

Example 2

Treated in same manner as described in Example 1, 2-ethylbutanal gave an 89% conversion to 2-ethylbutanol and a 91% conversion to sodium 2-ethylbutanoate.

Example 3

Treated in the same manner as described in Example 1, only employing potassium hydroxide rather than sodium hydroxide, 2-ethyloctanal gave a 92% conversion to 2-ethyloctanol and a 93% conversion to potassium 2-ethyloctanoate.

Example 4

Treated in the same manner as described in Example 1, only employing potassium hydroxide rather than sodium hydroxide, 2-ethylisohexanal gave a 93% conversion to 2-ethylisohexanol and a 95% conversion to potassium 2-ethylisohexanoate.

We have illustrated our new reaction with the use of aqueous sodium and potassium hydroxide. However, in general, any aqueous or alcoholic alkali metal hydroxide or alkoxide solutions, preferably concentrated, can be employed including, for example, the hydroxides of sodium, potassium, and lithium and alkoxides such as sodium, potassium, or lithium methoxide, ethoxide, butoxide, 2-ethylhexoxide, etc. Sodium hydroxide is preferred for reasons of economy. The fact that the reaction can be carried out in the presence of this inexpensive base at moderate temperature constitutes an important advantage of our process. The aldehyde and base can be used in approximately stoichiometric amounts, or an excess of either can be present in the reaction mixture. The alkali metal hydroxides are preferably used as concentrated aqueous solutions, e.g., 30 to 50% concentration for sodium hydroxide. The alkoxides can be employed as anhydrous alcoholic solutions, the alcohol preferably being the alcohol formed in the reaction, so as to simplify purification of the products. When anhydrous alkoxide is employed the products are alkoxide and ester rather than alcohol and acid or salt, e.g.

2RCHO+MOR'→RCOOR'+RCH$_2$OM

Acidification then yields the desired acid and alcohol. The reaction can be carried out over a considerable temperature range with at least some degree of success, for example, 40–300° C., although best results are obtained in the range from about 100–150° C.

A valuable use of the new process is in the manufacture of acid salts usable as driers for paints. For example, the cobalt salt of 2-ethylhexanoic acid is a superior paint drier. It is prepared by reaction of the sodium salt with cobalt sulfate and the sodium salt of 2-ethylhexanoic acid can be prepared by the method of the present invention.

Although the invention has been described in considerable detail with particular reference to certain preferred embodiments thereof, it will be understood that variations and modifications can be effected within the spirit and scope of the invention as described hereinabove, and as defined in the appended claims.

We claim:
1. The method which comprises contacting an aldehyde of the formula, R$^1$R$^2$CHCHO, with a member of the group consisting of alkali metal hydroxides of the formula, MOH, and alkoxides of the formula, MOR$^3$, at 40–250° C. and recovering, when said hydroxide is used, a product comprising a salt of the formula,

R$^1$R$^2$CHCOOM and an alcohol of the formula, R$^1$R$^2$CHCH$_2$OH, and, when said alkoxide is used, a product comprising an ester of the formula R$^1$R$^2$CHCOOR$^3$ and an alkoxide of the formula R$^1$R$^2$CHCH$_2$OM; wherein R$^1$ and R$^2$ are alkyl of 2 to 8 carbon atoms, R$^3$ is alkyl or up to about 8 carbon atoms and M is alkali metal.

2. The method which comprises heating an aldehyde of the formula, $$\mathrm{H-\underset{\underset{R^2}{|}}{\overset{\overset{C_2H_5}{|}}{C}}-CHO}$$

with an alkali metal hydroxide at 40–250° C. and recovering a salt of the formula, $$\mathrm{H-\underset{\underset{R^2}{|}}{\overset{\overset{C_2H_5}{|}}{C}}-COOM}$$

and an alcohol of the formula, $$\mathrm{H-\underset{\underset{R^2}{|}}{\overset{\overset{C_2H_5}{|}}{C}}-CH_2OH}$$

wherein R$^2$ is alkyl of 2 to 4 carbon atoms and M is alkali metal.

3. The method according to claim 2 in which the alkali metal hydroxide is aqueous sodium hydroxide of 30–50% concentration and the temperature is 100–150° C.

4. The method which comprises heating 2-ethylhexanal with a concentrated aqueous solution of a member of the group consisting of sodium hydroxide and potassium hydroxide at 100–150° C. and recovering 2-ethylhexanol and the alkali metal salt of 2-ethylhexanoic acid corresponding to the hydroxide employed.

5. The method which comprises heating 2-ethylbutanal with a concentrated aqueous solution of a member of the group consisting of sodium hydroxide and potassium hydroxide at 100–150° C. and recovering 2-ethylbutanol and the alkali metal salt of 2-ethylbutanoic acid corresponding to the hydroxide employed.

6. The method which comprises heating 2-ethyloctanal with a concentrated aqueous solution of a member of the group consisting of sodium hydroxide and potassium hydroxide at 100–150° C. and recovering 2-ethyloctanol and the alkali metal salt of 2-ethyloctanoic acid corresponding to the hydroxide employed.

7. The method which comprises heating 2-ethylisohexanal with a concentrated aqueous solution of a member of the group consisting of sodium hydroxide and potassium hydroxide at 100–150° C. and recovering 2-ethylisohexanol and the alkali metal salt of 2-ethylisohexanoic acid corresponding to the hydroxide employed.

References Cited
UNITED STATES PATENTS 2,727,050  12/1955  Sutton _____ 260—413

OTHER REFERENCES

Geissman: Organic Reactions (Cannizzaro Reaction), vol. II, pp. 97–98.

NICHOLAS S. RIZZO, *Primary Examiner.*

J. A. NARCAVAGE, *Assistant Examiner.*